United States Patent [19]

McGrath et al.

[11] Patent Number: 5,024,759
[45] Date of Patent: Jun. 18, 1991

[54] MAGNETIC TREATMENT OF FLUIDS

[75] Inventors: Thomas M. McGrath, Miami; Arno W. Tilles, Hollywood, both of Fla.

[73] Assignee: Hydroquip Technologies, Inc., Miami, Fla.

[21] Appl. No.: 361,674

[22] Filed: Jun. 2, 1989

Related U.S. Application Data

[63] Continuation-in-part of Ser. No. 287,230, Dec. 21, 1988, abandoned.

[51] Int. Cl.$^5$ ............................................. C02F 1/48
[52] U.S. Cl. ...................................... 210/222; 210/695
[58] Field of Search ................... 210/222, 223, 416.1, 210/416.2, 451, 452, 695; 209/224, 232; 55/100, 3; 184/6.25; 415/121.2, 197, 196, 9, 128; 422/22, 23

[56] References Cited

U.S. PATENT DOCUMENTS

| | | | |
|---|---|---|---|
| 2,307,954 | 1/1943 | Radke | 184/6.25 |
| 2,459,534 | 1/1949 | Kennedy | 210/233 |
| 3,685,919 | 8/1972 | Speck et al. | 415/197 |
| 3,830,621 | 8/1974 | Miller | 55/3 |
| 3,959,145 | 5/1976 | Lundquist et al. | 209/222 |
| 3,998,669 | 12/1976 | Strnat | 148/103 |
| 4,065,386 | 12/1977 | Rigby | 210/223 |
| 4,289,621 | 9/1981 | O'Meara, Jr. | 210/222 |
| 4,303,504 | 12/1981 | Collins | 209/223 R |
| 4,366,053 | 12/1982 | Lindler | 210/222 |
| 4,367,138 | 1/1983 | Kustas | 209/224 |
| 4,496,395 | 1/1985 | Croat | 148/301 |
| 4,519,919 | 5/1985 | Whyte et al. | 210/695 |
| 4,594,160 | 6/1986 | Heitmann et al. | 210/222 |
| 4,605,498 | 8/1986 | Kulish | 210/222 |
| 4,645,603 | 2/1987 | Frankl | 210/695 |
| 4,662,314 | 5/1987 | Moore, Jr. | 122/379 |
| 4,711,271 | 12/1987 | Weisenbarger et al. | 137/827 |
| 4,834,870 | 5/1989 | Osterberg et al. | 335/306 |

OTHER PUBLICATIONS

Article "The Professional Plumbing-Heating-Cooling Contractor", Magnetic Water Conditioning Solves Hard Water Problem Without Salt, Aug., 1987.
Article/"Chemical Processing", Aug. 1985—Magnetic Fluid Conditioning System Allows 3000 ppm Hardness Without Cooling Water Scale Buildup.
Advertisement "American Magnetics, Inc.", Fluid Treatment with Magnets.
Advertisement, Innovative Products "Aqua-Doc TM", Water Conditioners by Magnetizer.
Advertisement—Snopkin Promotions, Inc.—"The Magnetizer System" of Water and Fuel Management.
Advertisement—Blue Water Products, Inc., "Save with Algarid ®", Magnetic Water Stabilizer.

Primary Examiner—W. Gary Jones
Assistant Examiner—Matthew O. Savage
Attorney, Agent, or Firm—Richard M. Saccocio

[57] ABSTRACT

A method and apparatus are disclosed for magnetically treating a flowing fluid. A magnetic structure comprising the plurality of magnets made from rare earth materials are arranged around the inside surface of a ring and with the north poles of the magnets facing inwardly. The magnetic structure is placed within a flow system with the pump being substantially immediately upstream of the magnetic apparatus. The method and apparatus disclosed herein results in superior and more convenient treatment of water using magnetic materials.

8 Claims, 4 Drawing Sheets

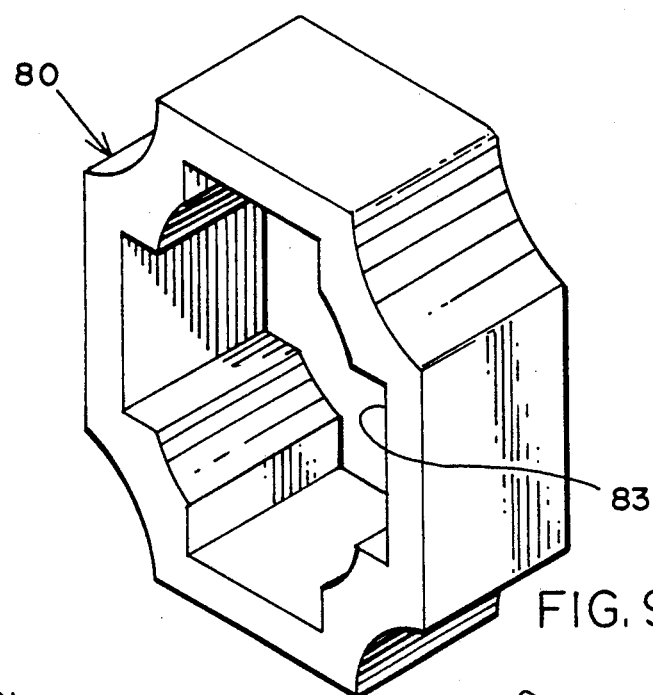
FIG. 9
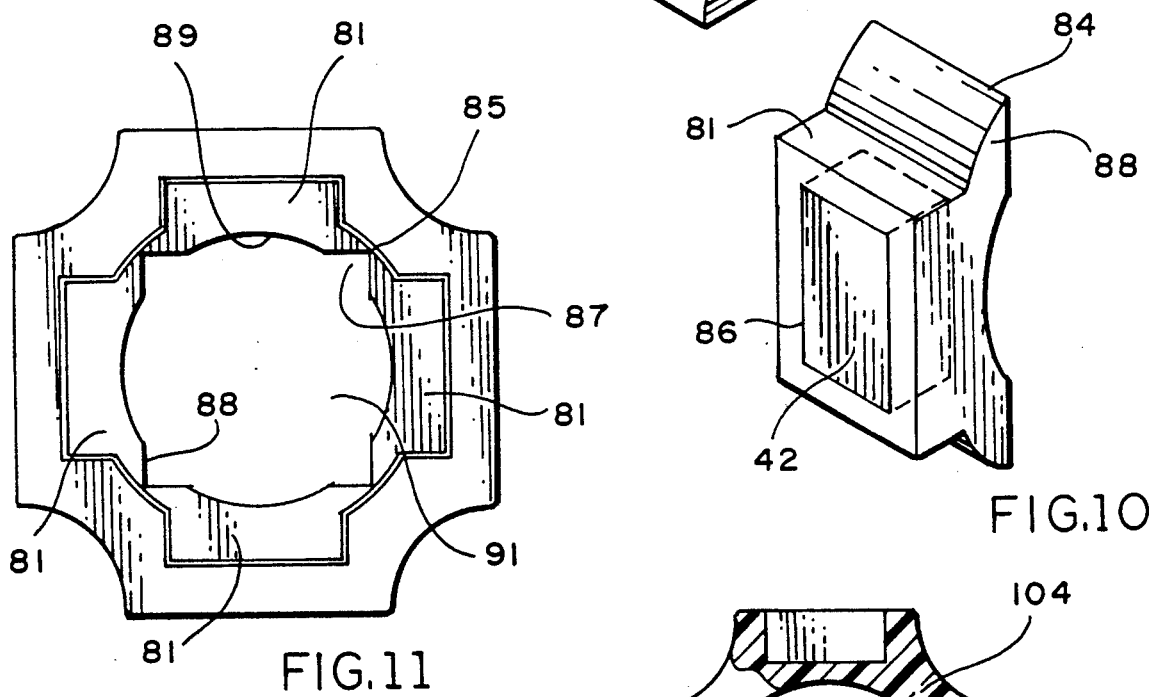
FIG. 10
FIG. 11
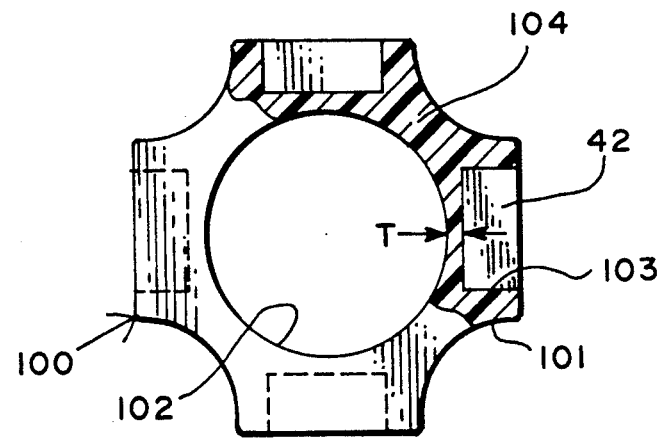
FIG. 12

MAGNETIC TREATMENT OF FLUIDS

CROSS-REFERENCE TO RELATED APPLICATIONS

This application is a continuation-in-part application of prior U.S. Pat. application Ser. No. 07/287,230, filed Dec. 21, 1988, entitled "Magnetic Treatment of Fluids," by Thomas M. McGrath and Arno W. Tilles, and assigned to Hydroquip Technologies, Inc., now abandoned.

BACKGROUND OF THE INVENTION

1. Field of the Invention

This invention pertains in general to the treatment of fluids, such as water, and in particular the magnetic treatment of water.

2. Description of the Prior Art

In the prior art there exists a fair number of devices whose function is to magnetically treat a fluid. One type of apparatus is used for removing solid particulate matter from the fluid by means of the magnetic attraction of the solid particulate matter to a magnet. Thereafter, the solid particulate matter is removed from a trap at the location of the magnets. This prior art type of arrangement depends upon the physical attraction of the solid matter within the fluid to the magnet. This arrangement has also been used where it is desirable to separate one or more materials from a slurry where one of the materials to be separated is ferromagnetic.

The prior art also discloses a number of magnetic water conditioning devices which are used to prevent and reduce a buildup of scale on the inner diameter of water pipes. Although not necessarily explainable from a theoretical point of view, it has definitely been established that passing flowing water through a magnetic field causes minerals dissolved within the water to remain in the same state and not be deposited on the inner walls of the pipes.

Regardless of the prior art to which magnets are used to treat a fluid, the prior art discloses the use of magnetic structures which either surround a metal conduit or are fitted within a metal conduit, either of which may use either permanent or electromagnets. Because the art of magnetically-treating fluids is strictly empirical and not capable of being expressed either mathematically or chemically, new and different magnetic structures and methods of utilizing magnets for the treatment of water may readily exist. The present invention comprises one of these new and different arrangements for the treating of water wherein improved results are obtained from the present invention as compared to the prior art.

Accordingly, it is object of the present invention to magnetically treat a fluid, such as water, in a more complete manner than what was accomplished in the prior art.

Another object of the present invention is to provide apparatus for magnetically treating a fluid, such as water, in a manner which is more efficient than that of the prior art.

Another object of the present invention is to provide apparatus for magnetically treating fluids, such as water, where relatively high (flow rate) velocities of the fluid exist.

Another object of the present invention is to provide apparatus for magnetically treating fluids, such as water, in such a manner that the water is directly in contact with the magnetic apparatus and yet does not cause a significant pressure drop.

SUMMARY OF THE INVENTION

The present invention accomplishes the above-stated objectives as well as others by providing magnetic treatment of a fluid or liquid flowing within hydraulic conduits.

The present invention may be adapted to be utilized within a closed hydraulic flow network or in an open hydraulic network with the fluid therein being pumped at relatively high velocities (flow rate) within the hydraulic conduits. Moreover, the magnetic apparatus is preferably located before a hydraulic pump or sufficiently downstream from a hydraulic pump such that the agitating or turbulent effects of the pump have dissipated.

In one embodiment, the magnetic structure comprises a frame member with a large opening therethrough and wherein powerful rare earth magnets are located opposite to each other and attached to the inner surface of the opening through the frame member. The frame member along with the magnets attached thereto is adapted to fit within the flange connection after a particle trap and before the hydraulic pump.

In another embodiment the frame member comprises an annular ring having the magnets attached to the inside thereof at opposite locations thereof. In this embodiment the overall configuration of the magnetic apparatus is such that it fits within a basket located within a particle trap upstream of the hydraulic pump.

Various other objects, advantages and features of the invention will become apparent to those skilled in the art from the following discussion taken in conjunction with the following drawings, in which:

BRIEF DESCRIPTION OF THE DRAWINGS

FIG. 9 is an isometric view of another embodiment of the frame member for containing the magnets to which the flowing fluid is to be exposed;

FIG. 10 is an isometric view of a magnet holder for use with the frame of FIG. 9;

FIG. 11 is a plan view of the assembly of the frame of FIG. 9 and the holders of FIG. 10; and FIG. 12 is a plan view of yet another embodiment of the inventive magnetic apparatus.

DESCRIPTION OF THE PREFERRED EMBODIMENTS

Figure 1:
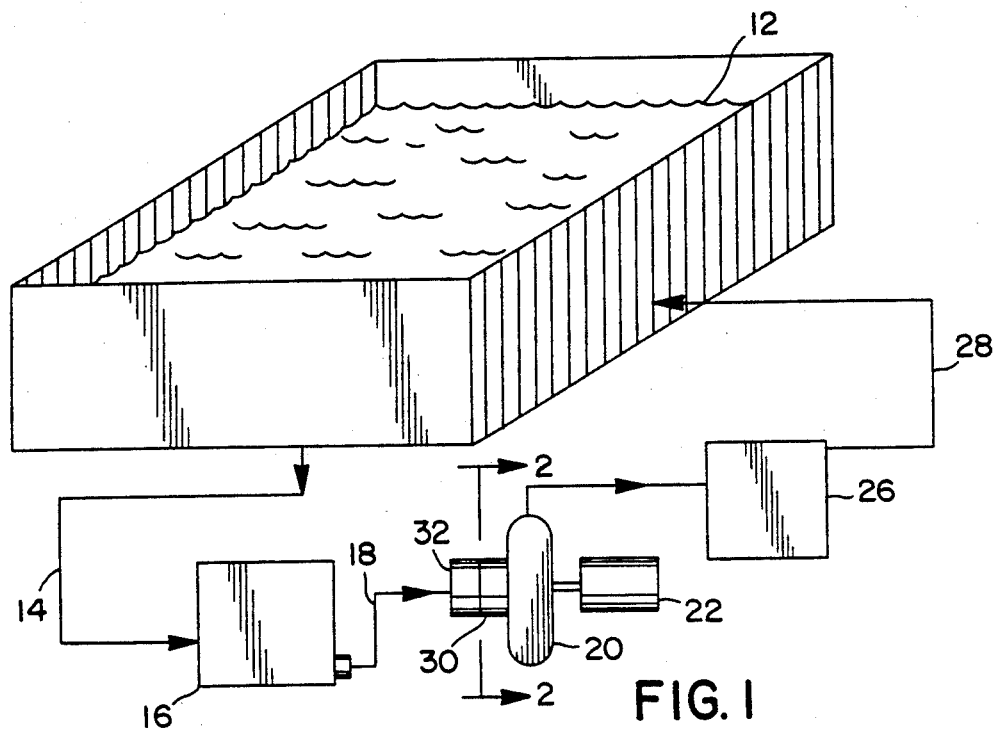
FIG. 1 is a schematic, isometric illustration of a water system within which the inventive magnetic apparatus may be utilized.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings wherein like characteristics and features of the present invention shown in the various figures are designated by the same reference numerals.

Referring now to the various figures of the drawings, it may be seen that FIG. 1 schematically illustrates a closed loop water system within which the inventive apparatus may be utilized. The system shown in FIG. comprises a typical circulation system for a swimming pool. Water in the swimming pool 12 exits from a bottom drain thereof into line 14 which is connected to a particle trap 16. Any solid particles in the water remain trapped within a basket within particle trap 16. From time to time, the basket may be removed for purposes of cleaning out the debris collected therein and subsequently replaced back into service. Water leaving particle trap 16 flows through a conduit which terminates at the inlet port of a hydraulic pump 20. An electric motor 22 may be utilized as a source of power for hydraulic pump 20. High-pressure water output from pump 20 is ducted through line 24 into a filter 26 where very fine or extremely small particulate matter within the water is removed therefrom. Purified water exits filter 26 and flows through line 28 back into swimming pool 12. Circulation of the water in the afore-described manner continues until such time as pump 20 is shut off.

In most, if not all, hydraulic pumps, the inlet thereto comprises an opening in the face plate of the pump and at the center thereof. The face plate further includes a plurality of threaded holes around the circumference of the inlet hole which threaded holes are used for connection of a flow pipe having a flange at the end thereof. Once the flange is threadingly mated to the face plate of the pump, the pump 20 is ready to be put into service and to circulate the water within the system as shown in FIG. 1.

Figure 2:
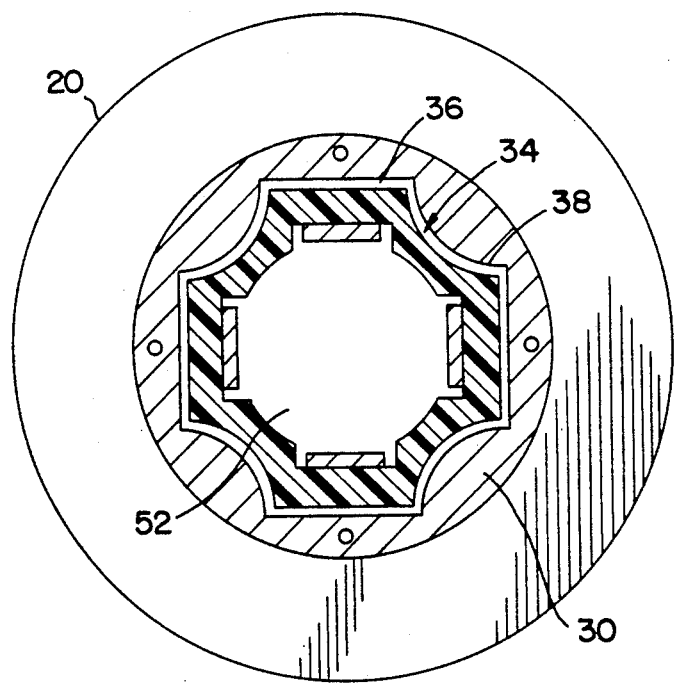
FIG. 2 is a cross-sectional view taken along the line 2—2 of FIG. 1.

In many installations the inlet opening 34 within the face plate 30 of pump 20 is that as shown in FIG. 2. In such arrangements the inlet opening 34 has a cruciform type of shape wherein four straight sides thereof are connected by a concave segment of a circle. On hydraulic pumps which do not have the cruciformed shape shown in FIG. 2, the inlet hole comprises a circular hole. In either case, however, the size of the inlet opening 34 is substantially larger than the size of the flow pipe 18 which is connected to the pump inlet. By placing the magnetic apparatus as provided herein within inlet opening 34, a negligible pressure drop occurs.

Figure 3:
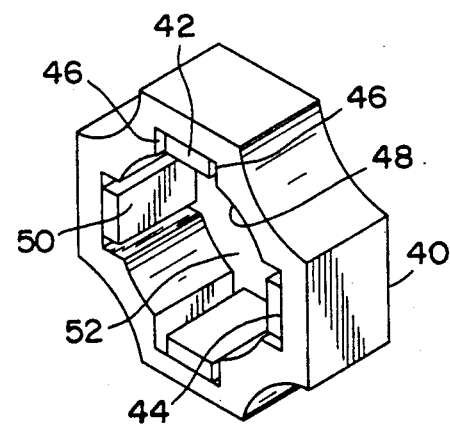
FIG. 3 is an isometric view of one embodiment of the magnetic structure according to the present invention.

FIG. 3 comprises a magnetic apparatus made in accordance with this invention which is adapted to fit within a face plate 30 of a pump 20 having the internal configuration 34 as that shown in FIG. 2.

Referring now to FIG. 3, it may be seen that a generally circular, solid frame member 40 comprises a structural support for positioning and attaching magnets 42 thereto. Magnets 42 are fitted within a cutout 44 which cutouts 44 are positioned in four places around the inner surface of support frame 40 and at 90° spaced from each other. More than four magnets at a decreased spacing may also be used. The length of each cutout 44 is somewhat larger than the length of magnet 42. This difference in length between the two members allows an open space 46 on each side of magnet 42 within cutout 44. The space between adjacent cutouts 44 comprises a web portion having an internal configuration of a segment of a circle. Hence, in cross section, as shown in FIG. 2, the combination of webs 48 and faces 50 of magnets 42 approximates a circular opening 52. The cross-sectional area of opening 52 is preferably at least equal to or greater than the cross-sectional area of flow conduit 18 in order to minimize the pressure drop thereacross.

Figure 5:
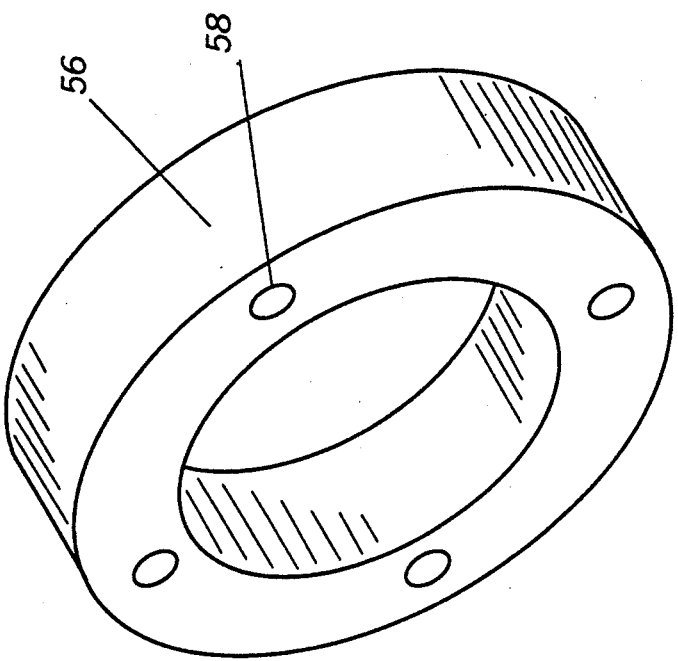
FIG. 5 is a schematic view of a ring member which allows adaptation of the present invention to hydraulic pumps not having an enlarged flow area opening at the inlet thereof.
Figure 4:
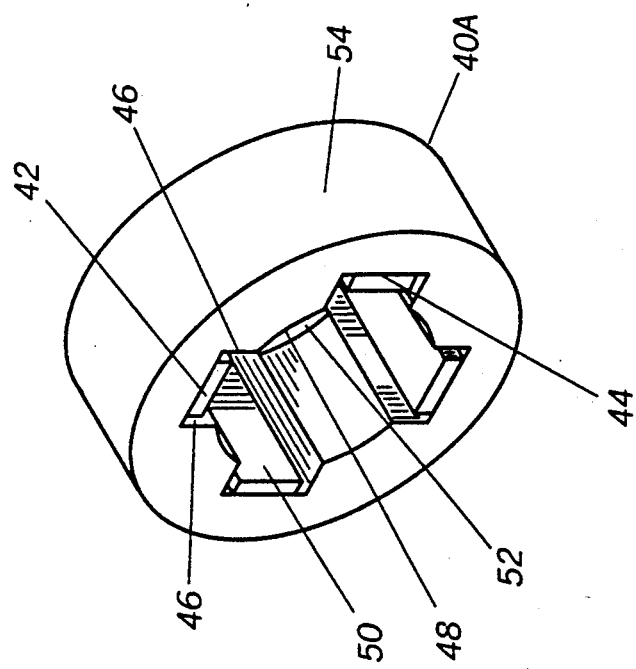
FIG. 4 is another embodiment of the inventive magnetic structure made in accordance with the invention.

The configuration of frame member 40A as shown in FIG. 4 includes a cylindrical outer surface 54. The internal configuration of frame member 40A and magnets 42 is the same as that shown and described in FIG. 3. The embodiment of FIG. 4 is intended to be used at the inlet to hydraulic pumps which do not have either the cruciform configuration 34 or an opening having a cross-sectional shape substantially larger than the cross-sectional area of flow conduit 18. In such applications an annular ring 56 having an enlarged internal configuration as shown in FIG. 5, allows placement therein of the frame member 40A of FIG. 4. Holes 58 are provided in ring member 56 in alignment with the holes in pipe flange 32 and face plate 30 of a hydraulic pump 20. In this manner a ring 56 with an insert comprising the magnetic structure shown in FIG. 4 placed within ring 56 may be inserted between flange 32 and face plate 30 immediately upstream of pump 20.

Figure 6:
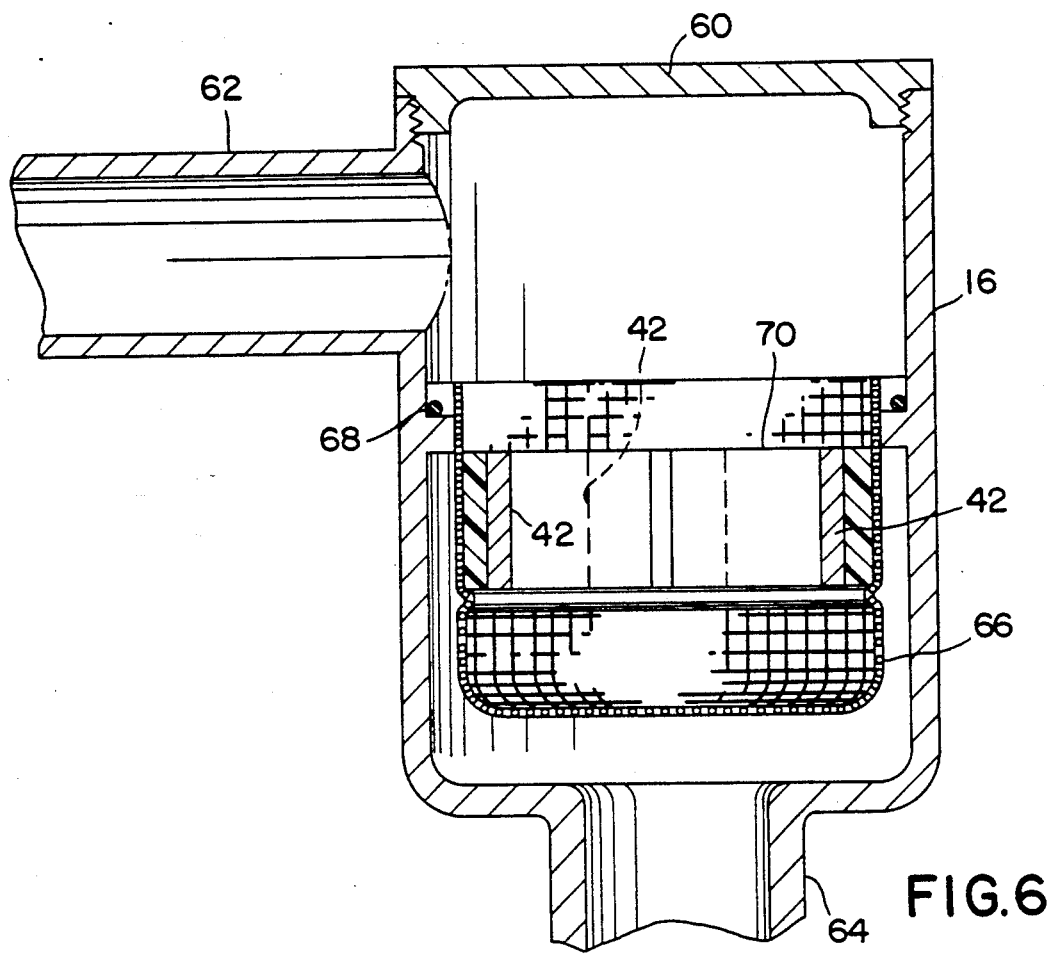
FIG. 6 is a schematic, cross-sectional view of a further embodiment of the present invention when utilized within a typical, solid particle trap.
Figure 7:
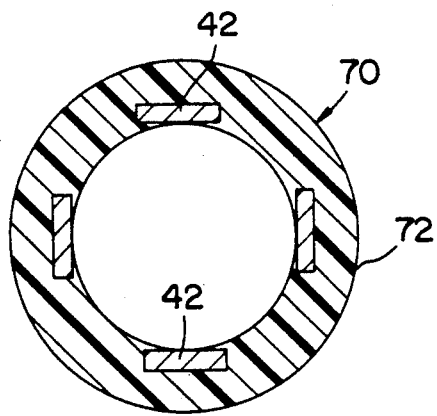
FIG. 7 is an isometric view of one embodiment of the magnetic structure of the embodiment of FIG. 6.
Figure 8:
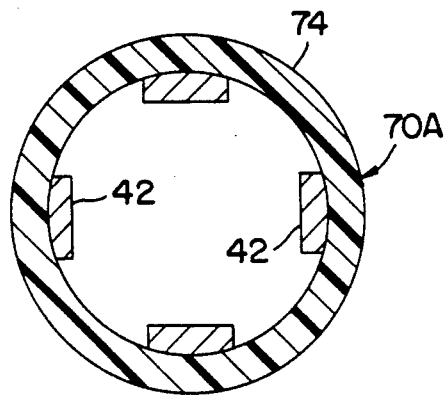
FIG. 8 is an isometric view of another embodiment of the magnetic structure of the embodiments of FIGS. 4 and 6.

FIGS. 6, 7, and 8 illustrate further embodiments of the inventive magnetic apparatus used to treat fluids. FIG. 6 schematically illustrates the solid particle filter trap which is generally placed immediately upstream of the hydraulic pump. The purpose of such a trap is, of course, to remove relatively large and solid particles from the liquid so that such particles do not damage or clog the impellers of the hydraulic pump. Solid particle filter trap 16 comprises a cylindrical body having a removable top 60 sealingly connected thereto. Water from the swimming pool or other objects enters trap 16 through inlet 62 at the upper side thereof and exits therefrom through outlet 64 located at the bottom thereof. Within trap 16 a removable basket 66 having a plurality of small holes therethrough, is fitted within trap 16 and rests on a ledge 68 within the trap 16. Basket 66 is easily removed from the trap 16 so that any debris collected therein may be appropriately disposed of.

Magnetizing apparatus 70 comprises an annular member 72 which serves as a housing or a support for magnets 42. In the embodiment of FIG. 7 magnets 42 are embedded within the annular ring 72. The magnetic apparatus 70 of FIG. 6 may be constructed by arranging magnets 42 opposite to each other and 90° or less apart from each other within a mold and then injecting an appropriate plastic material into the mold forming ring member 72 with magnets 42 embedded therewithin. The magnetic apparatus 70A of FIG. 8 provides for securing the magnets 42 to the inner surface of a ring member 74. In use, magnetic apparatus 70 is placed within trap 16 in such a manner that it treats the flow passing in and through trap 16. As shown in FIG. 6, magnetic apparatus 70 or 70A is placed within the basket 66. More than four magnets 42 may be used within rings 40, 40A, 72, or 74. In order to increase the magnetic field created by magnets 42, the embodiments of FIGS. 7 and 8 may be combined to provide both imbedded magnets and secured magnets. Also, ring members 40, 40A, 72, or 74 may be made from a magnetic material.

In all of the above embodiments, it is preferred that the magnets 42 be made from rare earth elements such as neodymium as in neodymium iron magnets or samarium as in samarium cobalt magnets or cerium in ceriumcopper magnets, or other rare-earth materials with different stoichiometric compositions or formulations. The use of such magnetic materials provides for magnets having a relatively small size in a relation to the magnetic pole strength of the magnet as compared to ordinary magnets. That is, these magnets possess high magnetism in a small volume of material. Further, rare-earth magnets have a high intrinsic coercive force capability which prevents any demagnetization influences. The magnets 42 may be substantially rectangular in shape. They are magnetized through their thickness with the north pole on the face of the magnet which faces the other magnets and the south pole on the opposite face which faces away from the magnets. Or, in the alternative, the magnets may be arranged with all of the south poles facing each other. In this manner the water to be treated is exposed either to the north pole of each magnet or to the south pole of each magnet. And, the pole arrangement provides a strong magnetic field gradient across the water. In the arrangement of the embodiments of FIG. 3 and FIG. 8, the flowing fluid is also in contact with the sides of the magnets 42. The contact of the fluid to the sides of magnets 42 where a magnetic field gradient also exists allows for and provides increased magnetic treatment of the fluid. The unique use of high-strength magnets and their unique arrangement within the closed circuit described above, provides for a more efficient magnetic treatment of the flowing fluid as compared to the prior art technology. This greater efficiency provides for magnetically treating fluids having high flow rates, which flow rates in the prior art prevented effective treatment of the water. Further, since the fluid is in actual contact with the magnets 42, the inventive magnetic apparatus described herein is obviously superior to the prior art technology where the magnets were located on the outside of the flow pipes which required the magnetic field to pass through the walls of the pipe before reaching the fluid therewithin.

It has been found that the neodymium magnets tend to accumulate a debris buildup thereon when in use. While this buildup does not materially affect the performance of the neodymium magnets, it is preferable that a flexible plastic coating be applied over and around the magnets at their supporting structure. No buildup occurs on the flexible plastic coating. The samarium cobalt magnets do not experience a buildup of debris. All the rare-earth magnets, in general, also do not magnetically degenerate due to aging or material deposition because of their high intrinsic coercive force capabilities against demagnetization.

Another embodiment is disclosed in FIGS. 9 through 11. Referring now to these figures, it may be seen that frame member 80 has the same overall general shape as that shown in FIG. 3 and is shaped to fit within the same inlet opening 34 within face plate 30 of pump 20 as per the embodiment of FIG. 2. The internal configuration of frame member 80 is, however, different from that of frame member 40. The magnets 42 fit securely within a cutout 86 in magnet holder 81.

A set of four magnet holders 81 having magnets 42 therein are fitted to frame member 80 at positions 83 as shown in FIG. 11. The resulting inner opening 91 comprises a substantially circular opening but with a triangular cutout 87 at four locations therearound. Such shape of opening 91 thereby provides a larger flow area than that of the pipe 18 leading into face plate 30. Such larger flow area reduces the flow rate of the fluid flowing therethrough so as to enhance the lysing effect described hereinafter. If desired, tips 88 may be removed from each magnet holder 81 so as to further increase the flow area of opening 91.

The magnet holders 81 with magnets 42 therein may be permanently attached to frame 80 such as by gluing. If used, the ends 84 of tips 88 abut together 85 as shown in FIG. 11. The abutting of tips 88 cause magnet holders 42 to be snap fitted together at 85 within frame 80 which helps retain the holders 42 in place while being glued within frame 80. Since the embodiment of FIG. 11 provides a complete cover around magnets 42, there will not be a buildup of debris on any of the surfaces of magnets 42.

FIG. 12 illustrates another embodiment of the frame member 100. The external peripheral shape 101 is the same as that of frame members 80 and 40. The inside opening 102 is circular. Four pockets 103 are provided in frame member 100 opposite each other for purposes of fitting therein magnets 42, which again may comprise neodymium iron. As may be seen, the embodiment of FIG. 12 provides a cover or coating for neodymium magnets 42 such that no buildup of debris can accumulate on the covered surfaces of magnets 104 by the fluid flowing through opening 102.

The configuration of the embodiment of FIG. 12 also allows for a greater increase in the flow area through frame member 100 because of the one-piece construction and the ability to keep the thickness of the material across T very thin. This is so because the thickness across T is only required to act as a covering for the magnet 42 therebehind. Even further increases to the flow area of opening 102 can be achieved by removing material from the corner portions 104 of frame 100.

In use, the present invention has been found to cause a flocculation or bring together previously suspended or colloidally dispersed particles within the water when the magnetic structure is used initially with previously untreated water. The flocculated particles are then trapped in the water filtration system. Thereafter, the water is crystal clear and substantially reduces the need for pool vacuuming and minimizes the amount of chemicals, such as chlorine, acids, and algaecides needed to keep the water in a clean, non-algae forming state.

Various tests of different magnet arrangements to result in flowing water being exposed to different pole configurations have shown that monopolar configurations will permit a wide dynamic range of water flow rates for the above-described apparatus without altering the performance of the magnetic apparatus. Also, that monopolar arrangements produce a high holding force which in combination with a symmetric monopolar field distribution produce both chain-like and clumped polarizations of particles within the water over wide dynamic flow rates.

A literature study has revealed that there if an effect upon microcellular organisms such as algae or other undesirable particles or bacteria such as *escherichia coli* by the treatment of water with magnetic apparatus as that described above. One reference reported that there was a significant observable response in an experimental tank in twenty-four to forty-eight hours. Chlorophyll was reduced by more than eighty-ninety (80-90%) per cent in forty-eight hours with plate counts also being significantly reduced.

The possible explanation was reported to be due to the interaction of proton-motive force with alternating magnetic fields. Considering extremely low frequency or static magnetic fields, a Lorentzian force can cause an electric field gradient across the cellular membranes.

Using the above-described apparatus, it is estimated that a twenty-five times stronger magnetic field is created than that used in a test wherein the lesser magnetic field caused cellular rupture. Thus, it appears likely that the stronger magnetic field will have a stronger effect on the thriving microcellular organisms. Therefore, the prevalence of the stronger magnetic field can act on moving algae cells, rupturing their cellular membranes (lysing). This would subsequently kill the growth of algae in such magnetically treated water.

In accordance with the above, the present invention provides for magnetically treating a flowing fluid, such as water, in a superior and more convenient manner than that of the prior art.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims here appended.

We claim as our invention:

1. Magnetic apparatus for magnetically treating microcellular organisms such as algae and *escherichia coli* in flowing water over a wide range of flow rates comprising:
   a frame member having a plurality of magnets attached therearound such that the same pole of each magnet faces inside said frame toward the other magnets wherein said frame comprises an eight-sided member with an outer periphery having four flat sides positioned at 90° to each other, and four concave surfaces each connecting adjacent flat sides, an opening through the center of said frame member and a magnet imbedded in each of the four flat sides.

2. The magnetic apparatus of claim 1, wherein said plurality of magnets comprise:
   rare earth magnets made from the group of rare earth materials consisting of neodymium, samarium, or cerium.

3. The magnetic apparatus of claim 1, wherein said plurality of magnets comprise any rare-earth material in combination with any other material with stoichiometric compositions or formulations.

4. The magnetic apparatus of claim 1, wherein said magnets comprise neodymium iron.

5. The magnetic apparatus of claim 4, wherein said magnets have a plastic coating therearound.

6. The magnetic apparatus of claim 1, wherein said frame includes a pocket in each of said four flat sides with one of said magnets being fitted within each of said pockets.

7. The magnetic apparatus of claim 1, wherein said magnets are made from samarium cobalt.

8. The magnetic apparatus of claim 1, wherein said magnets are made from cerium copper.

* * * * *